United States Patent [19]

Schonball

[11] 3,974,396
[45] Aug. 10, 1976

[54] ELECTRIC GENERATOR ARRANGEMENT

[76] Inventor: Walter Schönball, 45, Chemin-Moise-Duboule, Geneva, Switzerland, 1211

[22] Filed: Jan. 8, 1975

[21] Appl. No.: 539,594

[30] Foreign Application Priority Data
Jan. 18, 1974  Switzerland............................ 687/74

[52] U.S. Cl................................ 290/54; 318/382; 322/27; 322/42; 310/118
[51] Int. Cl.² ........................................ F02N 11/04
[58] Field of Search .................. 270/42, 43, 54, 55, 270/1 R, 5; 307/434, 84; 322/27, 42, 59, 29; 318/157, 382; 310/112, 115, 118, 122

[56] References Cited
UNITED STATES PATENTS

| | | | |
|---|---|---|---|
| 2,137,738 | 11/1938 | Faubion............................ | 310/118 |
| 2,153,523 | 4/1939 | Roberts et al. ...................... | 310/115 |
| 2,696,585 | 12/1954 | Vermillion........................... | 310/118 |
| 3,191,080 | 6/1965 | Edwards............................ | 310/118 |

FOREIGN PATENTS OR APPLICATIONS

| | | | |
|---|---|---|---|
| 678,168 | 1929 | France.................................. | 290/5 |
| 997,332 | 1945 | France.................................. | 290/5 |

Primary Examiner—Robert K. Schaefer
Assistant Examiner—John W. Redman
Attorney, Agent, or Firm—Robert E. Burns; Emmanuel J. Lobato; Bruce L. Adams

[57]  ABSTRACT

An electric generator arrangement has at least two wind or water wheels rotatably mounted on a common stationary shaft and coupled such that they rotate in opposite directions with a given ratio or a progressively variable ratio. The wheels carry the two cooperating parts of a first generator and may also each carry the rotor of a second or third generator cooperating with a stator on the shaft, the field excitation or current loading of the second and/or third generator being used to control the speed of the wheels.

11 Claims, 4 Drawing Figures

ELECTRIC GENERATOR ARRANGEMENT

The invention relates to an electric generator arrangement with at least two wheels, which are arranged to rotate side by side on a common stationary shaft and whereof one supports the excitation part or the part producing the field and the other supports armature of a generator and which may be driven in opposite directions by external forces, in particular by wind or water force. An electric generator of this type may be constructed as a wind or water turbine with vanes or blades provided on the wheels.

owing to the opposed rotation of the two parts of the generator, compared with a conventional generator having a stationary stator, the relative speed between the field and armature may be doubled and thus the efficiency is correspondingly increased. This is advantageous particularly in wind wheels and water turbines, which generally achieve only relatively low speeds.

When both wheels rotate freely in opposite directions, then the foremost first wheel, seen in the direction of the wind or water, may reach a higher speed than the rear second wheel, in particular in the case of higher wind and water speeds, because the first wheel will receive a stronger wind or water force than the second wheel. This is unfavourable, because the maximum speed of the wheel must be limited in particular for mechanical and structural reasons. The same unfavourable behaviour of both wheels may occur when the load is changed and when the running of the generator, i.e. the relative speed between the field and armature, is electrically retarded or accelerated by appropriately increasing or decreasing the electrical load.

An object of the invention is to avoid this drawback in an arrangement of the afore-described type and to ensure that neither of the wheels exceeds predetermined maximum speeds.

It is another object of the invention to use in an optimal manner the conversion efficiency of the aerodynamic or aquadynamic wind or water profiles of the rotor wheels. It is known that for a given profile of the rotor wheels having a fixed angle of incidence, a determined wind velocity is optimal. When the wind speed varies the velocity of the rotor wheel must therefore be accelerated or slowed in order to maintain this optimum condition. For this purpose a control device that responds quickly to different wind speeds and allows an individual control of the front and the rear rotor corresponding to the fluctuating wind conditions is necessary.

This is achieved according to the present invention by mechanical and/or electromagnetic means.

As mechanical means, a reversing gear is provided between the two wheels, by which the two wheels are positively coupled and which has a predetermined speed ratio, for example 1:1; this reversing gear may also be an infinitely variable or progressively variable coupling gear, whose speed ratio may be varied depending on the maximum admitted speed and/or the optimal speed of the rotor profiles.

In the case of electrical means, at least one of the two wheels, which comprise the two parts of a first generator, also supports one part, the field part or armature of a second generator, whose other part is non-rotatably connected to the shaft. By regulating or controlling the current loading of the first generator, the relative speed of both wheels may thus be controlled, whereas by regulating or controlling the current loading or excitation of the second generator, the speed of the wheel belonging to the latter may be controlled to a given absolute speed. In this way, by electrical means, not only can the relative speed of the two wheels, but also their absolute speed may be individually controlled. Both solutions have the advantage that the wind force necessary for the control is used to generate electrical energy. This wind force is not lost as is the case in conventional devices wherein a variable-pitch propeller must be turned in order to reduce the effective wind force to obtain a controlled speed of the rotors. In the case of mechanical reversing gear the wind force that acts differently on both wheels will be divided uniformly to both wheels; in the case of electrical control, the wind force is accessible as useful electric energy at the output of each genrator. A minor part of the wind force is needed for the excitation current only if the second generator is controlled by increasing or decreasing the excitation voltage. Therefore, with the aforedescribed individual electrical regulation of both generators, the optimum speeds of rotation, depending on the wind and which are generally different for both wheels, may be provided in a simple manner.

Another advantage is that the rotating masses of the generator parts on the fixed axis act as a flywheel and stabilize the rotational speed if the wind varies, and reduce vibrations because of the larger masses.

Embodiments of the invention are illustrated in detail in the accompanying drawings, in which.

Figure 1:
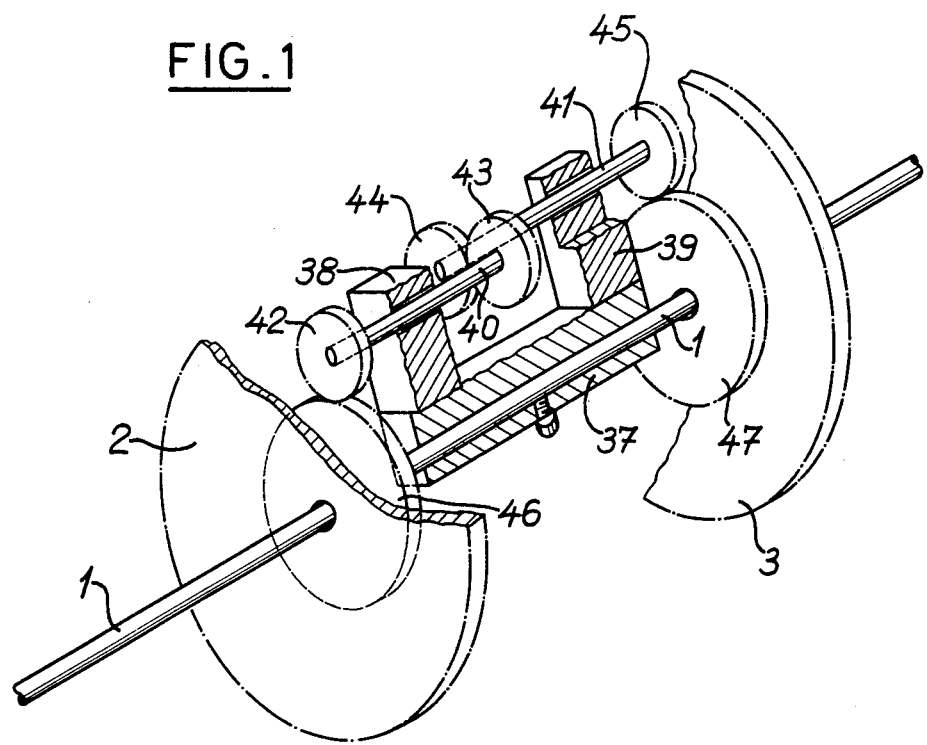
FIG. 1 shows a schematically illustrated embodiment of a reversing gear between the two wheels of a double wind wheel.

According to FIG. 1, the two wind wheels 2 and 3 are mounted to rotate on ball-bearings, on the fixed common central shaft 1, the vanes (not shown) of which wheels are so orientated that the wheels rotate in opposite directions under the action of the wind. A sleeve 37 is attached by screws to shaft 1, between the wind wheels 2 and 3 and to this sleeve are fixed supports 38 and 39 extending radially at a distance from each other. The support 38 forms a bearing for a revolving shaft 40 arranged parallel to the central shaft 1 and support 39 forms a bearing for a rotary shaft 41 arranged parallel to shaft 1 and to shaft 40. The shaft 40 carries gears 42 and 43 at its ends, the gear 42 meshing with a gear 46 fixed to the inner side of wind wheel 2. The other shaft 41 likewise carries gears 44 and 45 at its ends, the gear 45 meshing with a gear 47 fixed to the inner side of wind wheel 3. The two other gears 43 and 44 on shafts 40 and 41 are coplanar and mesh with each other. In this way, a contra-rotating positive connection of wind wheels 2 and 3 is achieved, the coupling gear comprising only four simple gears 42, 43, 44 and 45 on two rotating shafts 40 and 41. If both wind wheels 2 and 3 are to have the same speed, then four gears 42 to 45 of equal size may be used in a simple and economical manner. If a different fixed speed ratio is desired between the two wind wheels 2 and 3, the gears 43 and 44 may be replaced by other gears with different diameters.

The gear arrangement can also be modified such that gears 43, 44 are dispensed with and both gears 42 and 45 are mounted on a common shaft with one engaging an internal toothing of a toothed rim fixed on one of the wind wheels.

An alternative arrangement would be to employ a bevel gear engaging with inclined toothed crowns on the facing sides of wind wheels 2 and 3.

The described types of reversing gear are coupling gears with a fixed speed ratio. Naturally, infinitely variable or progressively variable coupling gears could be provided, whose speed ratios may be varied depending on the load.

Figure 2:
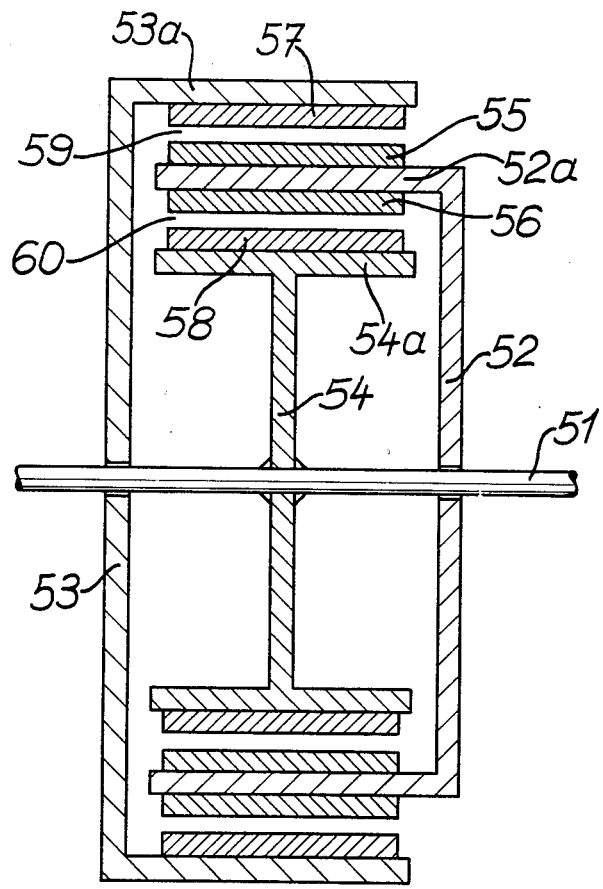
FIGS. 2 and 3 represent two schematically illustrated embodiments with a generator part of an additional generator fixed on the shaft.

In the example according to FIG. 2, two wheels 52 and 53, driven in opposite direction by an external force, by means of a reversing gear as described above, are mounted to rotate on a stationary common shaft 51. The wheel 52 has a cylindrical flange 52a extending towards the other wheel 53. Flange 52a is disposed concentrically about shaft 51 and carries on its outer periphery a generator part 55 of a first generator. The other wheel 53 has a cylindrical flange 53a overlapping the flange 52a radially, and carrying on its inner periphery the other generator part 57 of the first generator. Both generator parts define an air gap 59 on a cylindrical surface concentric to the shaft 51, and rotate in opposite directions.

Non-rotatably mounted between the two wheels 52 and 53, on the shaft 51, is a support 54 with a cylindrical flange 54a, to whose outer periphery is fixed the stator 58 of a second generator. The rotor 56 of this second generator is provided on the inner periphery of the flange 52a of wheel 52 and, with the stator 58, defines an air gap 60 which is likewise located on a cylindrical surface concentric to shaft 51.

Owing to the stationary stator 58 of the second generator, the speed of its rotor 56 and thus the speed of the wheel 52 may be controlled or regulated by appropriate variation of the current loading of the second generator, whereas the speed of the wheel 53 may be controlled or regulated by appropriate variation of the current loading of the first generator. The two generators may be electrically connected in series or in parallel in known manner.

Figure 3:
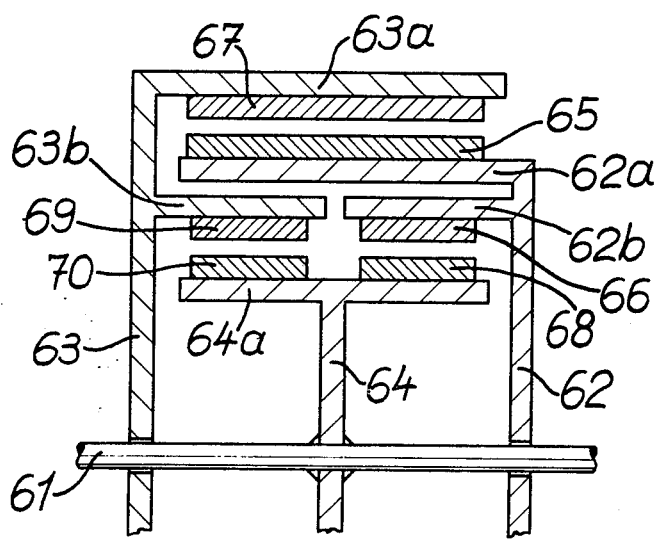

In the example according to FIG. 3, the electric generator arrangement comprises, as in the case of FIG. 2, two wheels 62 and 63 mounted to rotate on a shaft 61 and driven in opposite directions, and with cylindrical flanges 62a and 63a overlapping in the axial direction, which support two generator parts 65 and 67 of a first generator on their facing surfaces. Furthermore, the wheels 62 and 63 also have at opposite locations, inside the afore-mentioned first generator, a further cylindrical flange 62b, 63b respectively with a rotor part 66, 69 attached to the respective inner periphery. The axial length of both flanges 62b and 63b and rotors 66, 69 is less than half the distance between the wheels 62 and 63, and these parts are located with an axial spacing on a common cylindrical surface concentric to shaft 61. A support 64 non-rotatably mounted on shaft 61 between the wheels 62 and 63 has a cylindrical flange 64a located inside the flanges 62b and 63b, and to whose outer periphery two stators 68 and 70 are secured side-by-side radially opposite the respective rotors 66, 69. In this manner, the two parts 68 and 66 form a second generator and adjacent thereto the parts 70 and 69 form a third generator, these two additional generators being located concentrically inside the first-mentioned generator. As in the example according to FIG. 2, the relative speed of wheels 62 and 63 may be controlled by the corresponding current loading of the first generator formed by the parts 65 and 67 and the absolute speed of wheels 62 and 63 respectively may be controlled by the corresponding current loading or field excitation of the second and third generators consisting of the parts 66, 68 and 69, 70 respectively.

Instead of an internal stator as in FIGS. 2 and 3, it would be possible to provide one or two external stators formed by a cylindrical flange which cooperates with cylindrical rotor carried on the outer face of the respective rotating wheel to form a second (or third) generator.

Common to the examples of FIGS. 2 and 3 is the principle that a stationary generator part forms a fixed reference point as regards the electrical control of the speed of the wheels, so that not only the relative speed between the field and armature of each generator, but also the speed of the moving parts of all generators may be controlled by corresponding electrical "braking" to a greater or lesser extent.

In the case of wind or water turbines, the vanes or blades are preferably attached directly to the wheels and in particular at a radial distance from the common shaft, which is at least approximately equal to the mean radius of the generator part attached to the respective wheel. In this manner, the points of application of the wind or water force acting on the wheels have the same radial spacing as the points of application of the electrical braking force between the parts of the respective generator, which is advantageous for reasons of mechanical stability and safety.

If other external driving forces are used, the latter may also be transmitted to the wheels of a generator arrangement in any known manner, for example by driving belts engaging the periphery of the wheels or by gears.

The generator according to the invention may of course comprise more than two wind or other wheels. For example, three coaxial wheels could be provided, the two outer wheels rotating in one direction, at the same speed or with a given gear ratio, and the inner wheel rotating in the opposite direction, by means of an appropriate coupling. A generator would be provided between each adjacent pair of wheels.

In the examples according to FIGS. 2 and 3, the generator comprising the stator may be constructed as an auxiliary or control generator, whose rotor is provided on the wheel located downstream of the first wheel in the wind direction and which may be adjusted only if required by electrical loading or by field regulation so that its rotor, i.e. the rear wind wheel, reaches the optimum speed depending on the effective wind force, described in the introduction, at which speed the respective wind rotor efficiency is at its maximum. The optimum speed of the front wheel is controlled by "loading" of the first generator.

Figure 4:
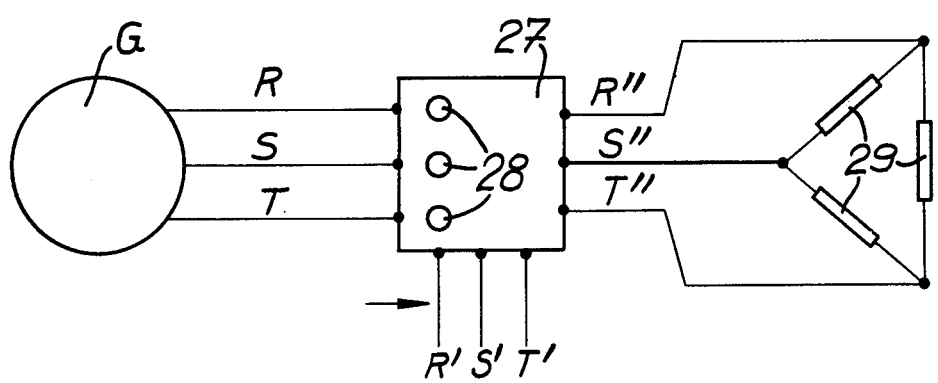
FIG. 4 is a circuit diagram for controlling the current loading of a generator arrangement.

In order to use the electrical output of the generator arrangement, which varies according to the fluctuating wind force, directly in an optimum manner without installing a buffer battery and to use it for example for supplying a system with constant voltage, according to FIG. 4, a control unit 27 may be connected to the output of the or each generator G, which supplies three-phase voltage in the example in question and therefore comprises the three output leads RST, which control unit comprises a first three-phase output R', S' and T' and a second output R'', S'' and T''. Connected in the output leads R'', S'' and T'', possibly in the form of a triangle, are three resistors 29, through which current passes continuously, whereas the output R', S' and T' serve for supplying any consumer devices and supply a controlled mains voltage. The control unit 27 is constructed so that it keeps the output voltage of the generator G, varying with the wind speed, at least approximately constant. For this purpose, it has an internal resistance varying depending on the output voltage of the generator G, which resistance decreases with the increasing output voltage of the generator such that the current loading the resistors 29, i.e. the generator load, increases and due to the electrical braking of the rotating generator parts thus produced, the speed of the wind wheels and thus the output voltage of the generator is kept at least approximately at a constant value. When the wind speed and thus the output voltage of the generator G decrease, then the internal resistance of the control unit 27 increases such that the current through the resistor 29, i.e. the generator load, decreases and therefore the speed or rotation of the wind wheels increases correspondingly, in order to keep the generator output voltage at least approximately at the predetermined constant value. An at least approximately constant voltage of at least approximately constant frequency is thus always available at the outputs R', S' and T' of the control unit 27, whereas an output fluctuating with the wind speed is taken off constantly via the resistors 29. The control unit 27 may operate with known controllable diodes or triodes, in particular controllable semi-conductors such as SCR or TRIAC members and comprise adjusting knobs 28 for the purpose of regulating the phase voltages. The resistors 29 may be heating resistors for example, which are installed in rooms or places to be heated. On the other hand, the fluctuating current at the outputs R'', S'' and T'' of the control unit 27 may also be used for the purposes of electrolysis, in particular the electrolysis of water.

The same unit 27 also serves for regulating the optimum rotor speeds as mentioned as a function of the wind speed or output voltage respectively to maintain the optimum conversion efficiency that depends for a given vane profile and angle of incidence upon the wind force.

The field-producing parts, the armatures of the generators and the electrical arrangements for controlling or regulating the current loading of the generators for the purpose of regulating the speed of the wheels are of known construction.

What is claimed is:

1. An electric generator arrangement comprising at least two wheels arranged to rotate side by side on a common stationary shaft and whereof one supports a field-producing part and the other supports the armature of a generator and which are arranged to be driven in opposite directions by an external force such as wind or water force, and means for so regulating the speed of rotation of both wheels that under all operating conditions the wheels rotate in opposite directions and with at least approximately predetermined speed ratios.

2. An electric generator arrangement according to claim 1, in which at least one of said two wheels which support the two parts of a first generator also supports a rotor of a second generator, a stator of the second generator being non-rotatably connected to said shaft whereby by the electrical regulation or control of the field excitation of the second generator or its current loading, the speed of the wheel of the second generator may be controlled by braking this wheel to a greater or lesser extent and by the regulation or control of the current loading of the first generator, the relative speed between said two wheels and thus also the speed of the other of said two wheels may be controlled.

3. An electric generator arrangement according to claim 2, in which the stator of the second generator fixed to the shaft is cylindrical and is arranged concentric to the shaft on a support disposed between said two wheels, the rotor of the second generator being disposed concentrically about its stator thus forming an air gap and being provided on the side of a flange of the first wheel facing said support, one generator part of the first generator is provided on the side of the flange of the first wheel facing away from said support and surrounds the second generator concentrically at a distance, and the other generator part of the first generator surrounds its first generator part concentrically, thus forming an air gap and is attached to a flange of the second wheel facing the afore-mentioned support.

4. An electric generator arrangement according to claim 3, in which apart from the parts forming the first generator, both of said two wheels support a further cylindrical rotor facing said mentioned support, these two rotors being located on a common cylindrical surface inside the first generator and having an axial dimension less than half the distance between the two wheels, each of said rotors concentrically surrounding a respective stator attached to said support, with an air gap, said stators being located on a common cylinder, one stator with the associated rotor of the first wheel forming a second generator and the other stator with the associated rotor of the second wheel forming a third generator.

5. An electric generator arrangement according to claim 2, in which said two wheels are arranged side by side and said stator of the second generator fixed to the shaft is located externally at an axial distance adjacent one wheel which supports the rotor of the second generator on the side adjacent the stator and supports the first generator part of the first generator on the opposite side, the second generator part of the first generator being fixed to the side of the other wheel facing the first wheel, and the stator of a third generator being located externally at an axial distance adjacent said other wheel, the rotor of said third generator being mounted externally of said other wheel facing its stator.

6. An electric generator arrangement according to claim 1, in which said regulating means consists of a reversing gear by which said two wheels are positively interconnected and which has a predetermined speed ratio or is infinitely or progressively variable, in particular depending on the load.

7. An electric generator arrangement according to claim 6, comprising two rotary shafts located between the two wheels, said rotary shafts being parallel to each other and to the stationary shaft of the wheels and each supporting two gears, the two rotary shafts being mounted in bearings which are stationary relative to the axis of rotation of the two wheels, the first gear of the first rotary shaft meshing with a gear attached to one wheel and the first gear of the second rotary shaft meshing with a gear attached to the second wheel, the second gears of the two rotary shafts being in mesh with each other.

8. An electric generator arrangement according to claim 6, comprising a rotary shaft supporting two gears mounted in a bearing between said two wheels parallel to the axis of rotation of said two wheels, said bearing being stationary relative to the axis of rotation of the wheels, an internal gearing on one of said two wheels meshing with a first of said gears, and an external gear ring on the other of said two wheels meshing with the second of said gears.

9. An electric generator arrangement according to claim 6, comprising at least one radial pin non-rotatably connected to the stationary central shaft of both wheels, between the two wheels, a bevel gear rotatably mounted on said pin and engaging with two spur bevel gears one of which is attached to one wheel and the other is attached to the other wheel, the toothing of said spur bevel gears meshing at diametrically opposed locations with the toothing of the bevel gear.

10. An electric generator arrangement according to claim 1, in the form of a wind or water turbine having vanes or blades attached to the wheels, in which the attachment points of the vanes or blades are radially spaced from the shaft of the wheels by an amount at least approximately equal to the mean radial spacing of the annular generator parts mounted on these wheels.

11. An electric generator arrangement according to claim 2, comprising an adjustable control unit connected to the output of each generator, said unit having a first electrical output for supplying any consumer devices and a second electrical ouput to which an electrical consumer device, for example heating resistances, is permanently connected, said control unit being so constructed that it controls the current load of the second consumer device and hence the degree of electrical braking of the corresponding generator depending on the effective wind or water force or on the output voltage of said corresponding generator, such that the rotor speed is always at least approximately maintained at an optimum value given an optimum conversion efficiency, or such that the voltage produced by the generator at the first electrical output of the control unit is at least approximately constant.

* * * * *